United States Patent Office 3,655,592
Patented Apr. 11, 1972

3,655,592
EXPANSIBLE PEARLS CONTAINING ETHYL-
ETHYLENE, PROPYLENE, AND SO₂ GROUPS
IN A COPOLYMER AND PROCESSES OF
MAKING THEM
Jean Chatelain, Lyon, France, assignor to Produits Chimiques Pechiney-Saint-Gobain, Neuilly-sur-Seine, France
No Drawing. Filed Aug. 29, 1968, Ser. No. 756,291
Claims priority, application France, Aug. 30, 1967,
119,424; July 22, 1968, 160,075
Int. Cl. C08f 47/10, 13/06
U.S. Cl. 260—2.5 B                              10 Claims

ABSTRACT OF THE DISCLOSURE

Expansible pearls containing propylene, ethyl-ethylene, and $SO_2$ groups with butene-1 and propane. They are useful as adjuvants to soil in agriculture, as insulation against sound and heat, and to make cellular articles by molding.

---

This invention relates to thermally expansible terpolymers of $SO_2$, butene-1, and propene containing a thermal expansion agent.

It has heretofore been proposed to prepare copolymers of $SO_2$ and ethylene but the products of such efforts and processes by which they have been produced have had small success. Some of such processes have been carried out at pressures above 200 atmospheres; others have been carried out in mass, in emulsion, or in solution but do not produce pearls, or a product in particles of reasonably uniform size, or they produce products which are combustible. Because of their amorphous or gummy constitution, such products are not readily employed in molding by injection or extrusion.

This invention is a continuation of the work described in prior copending application U.S. Ser. No. 533,784, constituting an extension, advance, and improvement of that work.

It is an object of this invention to prepare superior products being expansible pearls useful in aerating soil, for filling space and supporting the walls thereof, and which are capable of use by various molding techniques to make porous conglomerates, thermal and sonic insulation, and the like.

It is also an object of the invention to make such products by novel processes which are economically and technically efficient. Other objects are to form novel shapes from such expansible pearls.

The objects of the invention are accomplished generally speaking by thermally expansible terpolymers of $SO_2$, butene-1, and propene, containing an expansion agent, in which the ethyl-ethylene groups represent from 90% to 40% of the total weight of the ethyl-ethylene and propylene groups, the balance to make 100% being propylene groups, the molar ratio of $SO_2$ to the total of ethyl-ethylene and propylene groups equaling 1; and by the expanded terpolymers having the composition as aforesaid.

The object of the invention as to method is accomplished by making thermally expansible terpolymers of $SO_2$, butene-1, and propene which comprises suspending the three in aqueous medium containing a suspension agent and a polymerization catalyst with agitation at a temperature between about 20 and 65° C. at constant volume, the propene being added progressively, and mixing a thermal expansion agent with the terpolymer, preferably to about 5–12% by weight of the terpolymer.

The terpolymers of this invention are derived from $SO_2$, butene-1, and propene. They contain an expansion agent which is thermally activated. In these terpolymers the ethyl-ethylene group represents from 90–40% of the totality of the ethyl-ethylene and propylene groups, the balance to make 100% being propylene groups. The molar ratio of $SO_2$ to the total of alkylene groups is 1. The thermal expansion agent is preferably present from about 5 to about 12% by weight of the terpolymer. All proportions herein are by weight unless otherwise stated.

The new expansible terpolymers are in the form of hard regular pearls of which the mean diameter, when carried out under the conditions given in the following examples, is between 0.4 and 2 mm. The properties of these materials vary according to the proportion of propylene groups which they contain. Thus, as the content of propylene groups increases within the specified limits, the solubility of the terpolymer in organic solvents diminishes, their softening temperatures (Vicat) increase, and as a consequence cellular products of low density are readily prepared by their expansion. This control permits the production of cellular products having an apparent density of 10–50 kg./m.$^3$, which is quite useful in shortening the molding times required. A particular advantage is achieved, for example, with respect to copolymers of $SO_2$ and butene-1.

It has also been established that such terpolymers can be produced in which propylene is greater than 60% by weight of the total of alkylene groups, but this is unfavorable in its effect on the apparent density (mass volume) of the expanded volume of the terpolymers.

According to the invention, butene-1, propene, and $SO_2$ are copolymerized in an aqueous suspension, made by agitation in aqueous medium containing a suspension agent and a catalyst, at constant volume and a temperature between about 20° and 65° C. In this process propene is introduced into the polymerization medium in successive fractions or continuously until the polymerization ends whereupon the expansion agent is introduced and remains in contact with the terpolymer until about 5 to 12% of its weight of the terpolymer has been absorbed.

In one method of procedure the propene is added to the polymerization medium containing butene-1 and $SO_2$ at different stages of their copolymerization. The progressive advancement of the copolymerization of $SO_2$ and butene-1 may be evaluated by the pressure inside the reactor, the propene being added from time to time as temperature permits. In this way the propene is introduced as a partial or quasi-total polymerization of $SO_2$ and butene-1 is produced. This has the advantage that the formation of agglomerates and fine particles which have small ability to accept the expansion agent is avoided and a more uniform and useful product results than when all three monomers are added simultaneously.

It is also possible to introduce propene at a different temperature than that which pertains during the first stage of the copolymerization of $SO_2$ and butene-1. It is also within the scope of the invention to introduce butene-1 continuously or step-wise, the propene being introduced initially as the introduction of butene-1 is concluded. In the preferred form of the process, butene-1 and the propene are introduced simultaneously into the polymerization medium as a homogeneous mixture, but they can also be introduced simultaneously but separately. The simultaneous and continuous introduction of butene-1 and propene is carried out at a uniform speed which is a function of the reactivity of the polymerization medium, that is to say of the quantity of the monomers employed, of the relation of butene-1 and propene to the total quantity of these two olefins, of the temperature of the reaction, of the nature of the catalyst, and even of the speed of agitation. The continuous method of operating has the advantage of producing greater homogeneity in the pearls, which are solid all through and have regular sphericity. The sulfurous anhydride employed is preferably liquid and in excess of that which is required for the polymerization. This excess may be from 50 to 200% of that which is required in the polymerization. The polymerization requires 1 mole of $SO_2$ to each mole of the olefinic monomers. The proportions of olefinic monomers are from 40–90% by weight of butene-1 to 60–10% by weight of propene.

According to the process mechanical agitation is preferred to assist in suspending the monomers in the aqueous medium. The speed of agitation may be varied during the process as desired.

The addition of a suspension agent assists in suspending the monomers in the aqueous reaction medium, which is usually water. These suspension agents are illustrated by the polyvinyl alcohols and the cellulose derivatives, numbers of which are well known and have been used in cases requiring the employment of suspension aids in aqueous media. The quantity of suspension agent may conveniently be from 0.5 to 1% by weight of the organic monomers. The addition of the suspension agent can take place before or during the course of polymerization. If the suspension agent is not present during the first of the polymerization, the pearls tend to be larger, but the agent should be added in time to prevent coalescence of the pearls.

The catalyst should be organo-soluble inducers of free radicals, of peroxide type, of which acetyl cyclohexane sulfonyl peroxide, isopropyl peroxydicarbonate, and ethyl hexyl peroxydicarbonate are exemplary. The catalyst is used in such quantity as to produce about 5–30 mg. of active oxygen per mole of polymerizable olefin. Advantageously the catalyst may be dissolved in one of the monomers, for instance in the $SO_2$.

The thermosensitive expansion agents should have a boiling point at atmospheric pressure below or at about 50° C. They are represented by aliphatic hydrocarbons, cycloaliphatic hydrocarbons (cycloparafinic) saturated or not, and the halogenated derivatives of ethane or ethylene by substitution. Among such compounds are, for example, propane, butane, isobutane, pentane, hexane, butene-1, isobutene, pentene, hexene, cyclobutane, cyclopentane, dichloro - 1,2 - ethylene, trifluoro-trichloroethane and dichlorotetrafluoroethane.

The expansion agents are put into the suspension of the terpolymer at a temperature which may be that of polymerization or at a different temperature when the latter favors its penetration into the pearls. After agitation of the terpolymeric suspension containing the expansion agent, which may take from 1 to several hours, the reaction medium is cooled and the excess of sulfurous anhydride, other unreacted monomers, and of volatilizable expansion agent are recovered. The expansible terpolymeric pearls are then separated from the reaction medium by ordinary means such as filtration under vacuum or by centrifuge and are dried at a temperature between room temperature and 50° C. These pearls can be expanded by heating them, the temperature at which they expand being a function of the temperature of their Vicat softening point. The volume of the expanded products may attain 20–80 times their original volume according to the relative proportion of ethyl-ethylene to propylene groups, the conditions of expansion, and the content of the expansion agent. The expanded products may be used as pearls to fill voids, as inert impregnants to assist the irrigation of agricultural fields or, after having been molded, as porous conglomerates and thermal or sound insulation. The following examples illustrate the invention without limiting the generality of the principles elsewhere herein set forth.

EXAMPLE 1

A glass-lined autoclave of 16 l. capacity, with an impeller type agitator 21 cm. in diameter, heated by a double wall, received 12 l. of water in which 4 g. of polyvinyl alcohol and 31% by weight of polyvinyl acetate had been dissolved. The space inside the autoclave was purged three times by 100 g. of butene-1 and then received 700 g. of 98% pure butene-1, 2400 g. of $SO_2$ containing in solution 10 ml. of isopropyl peroxydicarbonate, in ethyl maleate, titrating 2.55% active oxygen. The reaction mass was agitated at 160 r.p.m. at 48° C. at constant volume, and developed autogeneous pressure of 8.5 bars. After 3 hours of reaction at 48° C., 40 g. of propene were introduced, the pressure rose to 9.8 bars and fell to 8.7 bars 30 minutes thereafter. An additional 40 g. of propene were added; the pressure rose to 10.2 bars and fell to 9.3 bars after an hour, whereupon 300 g. of a $C_4$ hydrocarbon petroleum fraction containing 14% alkanes and 86% unsaturated hydrocarbons (of which 54% were butene-1 and 27% butene-2 cis and trans) were added. The pressure fell to 8.2 bars and remained there for 3 hours. The reaction medium was cooled to 20°–25° C. and vented. The pearls were drained and dried and heated at 50° C. for 8 hours with a current of air. The yield was 96% of the butene-1 and propene engaged, of translucent pearls, regular, having a mean diameter of 0.5 mm. These pearls contain 15% by weight of propylene groups and 85% by weight of ethyl-ethylene groups per total weight of both. The molar ratio of $SO_2$ to the combination of both groups was 1. These proportions were determined by nuclear magnetic resonance and elementary analysis. The pearls included 8.1% by weight of volatile matter. They are soluble at 25° C. in dioxane, tetrahydrofurane, pyridine, cyclohexanone, nitrobenzene, acetone, dimethylsulfoxide, dimethylformamide, and tetrachlorethane. At the same temperature the copolymers of $SO_2$ and butene-1 are soluble in these same solvents and also in ethyl acetate, butyl acetate, butanone, acrylic nitrile, chloroform, and methylene chloride. The expansible pearls were worked up into a plate which had a Vicat softening temperature of 80° C. which was determined according to the French testing system NF T 51–021. The pearls were heated at 110° C. in the presence of water vapor to expand them, yielding a cellular product of which the apparent mass volume was 30 kg./m.$^3$.

EXAMPLE 2

Operating as in Example 1 but introducing 420 g. of propene in 8 shots instead of 120 g. in 3 shots the production was a 100% yield by weight of the butene-1 and propene employed. The product was pearls of 0.45 mm. diameter (average) containing 37% by weight of propylene groups and 63% by weight of ethyl-ethylene groups based on the total weight of those groups. The molar ratio of $SO_2$ in the product to the total of those groups was 1. The pearls contained 5.8% of the expansion agent, were soluble at 25° C. in dimethylformamide, dimethylsulfoxide, and pyridine. They were insoluble in dioxane, tetrahydrofurane, cyclohexanone, nitrobenzene, acetone, and tetrachlorethane. This example demonstrates the effect of increasing the proportion of propylene groups on solubility.

The temperature (Vicat) of softening was 99° C. By expansion at 115° C. the product was cellular with an apparent mass volume of 50 kg./m.$^3$.

EXAMPLE 3

An autoclave of 40 l. capacity of glass-lined steel equipped with a 30 cm. impeller and a heat-exchange jacket received 16 l. of clarified water in which 23 g. of polyvinyl alcohol containing 31% by weight of polyvinyl acetate had been dissolved. The apparatus was purged three times with 200 g. butene-1, and charged with 3000 g. 30% butene-1, 7000 g. $SO_2$ liquid in which 25 ml. of a solution of isopropyl peroxydicarbonate in ethyl maleate, titrating 2.55%, of active oxygen had been dissolved.

The reaction mass was agitated at 80 r.p.m. and the temperature was raised to about 48° C. at constant volume. After 5 hours the pressure was 8.3 bars, agitation was increased to 100 r.p.m. and 430 g. propene were introduced. The pressure increased to 13.8 bars and decreased to 12 bars after a further hour of reaction. Agitation was increased to 125 r.p.m., 430 g. of propene were introduced, the pressure rose to 15.7 bars and fell to 13.7 bars after an hour. Agitation was increased to 150 r.p.m., 430 g. propene were added, the pressure rose to 16.7 bars and fell to 16.2 bars after an hour. Agitation was increased to 220 r.p.m., 900 g. of the petroleum fraction of Example 1 were added, the pressure stabilized itself at 12.5 bars and remained constant for 3 hours. The reaction mass was cooled, vented to recover gases and the product, pearls, was dried for 8 hours in an air current of 50° C.

The product contained 90% of the weight of the butene-1 and propene employed, and was composed of opaque pearls of a mean diameter of 0.8 mm. They contained 30% by weight of propylene groups and 70% ethyl-ethylene groups based on the total weight of such groups, and the $SO_2$ content was to the total of these groups as 1–1 by molar weight. The pearls contained 5.1% of the expansion agent. When expanded at 115° C. in the presence of water vapor, they had an apparent density (mass volume) of 32 kg./m.$^3$. After resting 24 hours at ambient temperature they were molded in steam, producing an object having an apparent density of 34 kg./m.$^3$. Molding time was 6 to 10 minutes whereas a copolymer containing only $SO_2$ and ethyl-ethylene groups (1–1 by molar weights) required 15–20 min. under identical molding conditions.

EXAMPLE 4

An autoclave identical with that of Example 3 received 12 l. of clarified water and the atmosphere in the autoclave was ejected by a mixture of propene and butene-1 in a proportion of 20 to 80 by weight, after which 10 kg. of $SO_2$ and 25 ml. of a solution of diisopropyl peroxydicarbonate in ethyl maleate, titrating 2.64% active oxygen, were added.

The reaction medium was agitated at 100 r.p.m. and the temperature was raised to 50° C., the autogenous pressure attaining 7 bar. The temperature was kept at 50° C. throughout the reaction. After six hours an injector pump was used to inject 4.2 kg. of a homogeneous mixture of 20/80 propene-butene-1 by weight by continuous flow. The pressure increased to 10.5 bars. After one hour of this injection, another injection pump injects, in two hours, 400 ml. of water containing 6 g. of polyvinyl alcohol in which were 31% of its weight of polyvinyl acetate. As soon as the introduction of the olefinic mixture ended, the pressure fell to 8 bars in two hours. 1.5 kg. of technical isobutylene were then introduced and remained in contact with the reaction mass for two hours, the temperature remaining at 50° C. The reaction medium was then cooled to room temperature and vented to recover unused gases. The product was in the form of pearls which were washed and dried at 50° C. for 24 hours in a current of air. The yield was 9.4 kg. of pearls having a mean diameter of 0.83 mm., a yield of 94% with respect to the butene-1 and the propene employed. These pearls contain 19.5% by weight of propylene groups to 80.5% by weight of ethyl-ethylene based on the total weight of both groups. The molar ratio of $SO_2$ to the total weight of these groups is 1. The pearls contain 5.9% by weight of expansion agent. The volume mass of the terpolymer measured by the picnometer at 22° C. was 1.39. The softening point of the product (Vicat) measured as in Example 1 was 99° C. The pearls were expanded with a mixture of water vapor and air at 130° C., yielding a cellular product having an apparent mass volume of 28 kg./m.$^3$.

EXAMPLE 5

The operation was carried out as in Example 4 except that 12 kg. of $SO_2$, 45 ml. of the same catalyst solution, and 6 kg. of a mixture of propene and butene-1 containing one-third of propene was used. The mixture was introduced in a stream over a period of seven hours. After an hour of introduction a stream of 20 g. of the same suspension agent used in Example 1 was added over a period of six hours. The initial pressure was 7 bars, which rose to 13.1 bars at the end of the olefinic introduction, falling to 9 bars two hours later. 15% by weight of an expansion agent, calculated with respect to the theoretical content of the copolymer were added. It was composed of 1 part by weight of transdichloro-1,2-ethylene and 1 part by weight of a mixture of saturated hydrocarbons containing 30% of propane and 40% of normal butane and 30% of isobutane. This remained in contact for an hour at 50° C. then the reaction mass was cooled to room temperature and vented. The product was pearls which were washed and dried. The yield was 12.3 kg. of pearls having a mean diameter of 0.65 mm. representing a yield of 86% of the combined weight of butene-1 and propene employed. The pearls contain 33% by weight of propylene groups and 67% by weight of ethyl-ethylene groups based on the weight of the olefins. The molar ratio of $SO_2$ to the olefinic constituents was 1. The pearls contain 6.5% by weight of volatile matter. The volume mass of the terpolymer measured by the picnometer at 22° C. was 1.4. The Vicat softening point determined as in Example 1 was 106.5° C. By expansion with the aid of a mixture of water vapor and hot air at 150°–160° C. these pearls expanded to an apparent mass volume of 25 kg./m.$^3$. The expanded pearls were aged in free air for 30 days at room temperature and then subjected to a new expansion at about 120° C. with the aid of a mixture of water vapor and hot air. The expanded pearls had an apparent mass volume of 14 kg./m.$^3$. After aging in free air at room temperature the pearls were again expanded with a mixture of 75% water vapor and 25% air by volume at a temperature of 100° C. A single pearl was measured and tested, assuming that The coefficient of expansion $$= \frac{\text{volume of the expanded pearl}}{\text{volume of the pearl before expansion}}$$

at 100° C. After cooling in free air to room temperature, the results were:

| Aging time in days | Coefficient of expansion [1] | Coefficient of expansion [2] |
|---|---|---|
| 12 | 37.5 | 25 |
| 22 | 42.5 | 34.5 |
| 41 | 47 | 39 |

[1] At 100° C.
[2] At room temperature

It is to be observed that the expansion is the greater as the aging time is the longer.

EXAMPLE 6

The autoclave of Example 1 received 15 l. of twice clarified water. The atmosphere was ejected by a mixture of 50/50 propene-butene-1. 5 kg. of $SO_2$ were added and 8 ml. of the solution of diisopropyl peroxydicarbonate employed in Example 4. The reaction medium was agitated at 160 r.p.m. and heated to 50° C. throughout the polymerization. 1.4 kg. of a homogeneous mixture of butene-1 and propene, 50/50 by weight, was introduced by continuous flow over five hours. After one hour of that introduction there were added in a period of two hours 3 g. of polyvinyl alcohol containing 18% by weight of polyvinyl acetate in 400 ml. of water. The pressure was 7 bars at the beginning of the introduction of the olefins and 11.3 bars at the end of that introduction, falling to 8.8 bars thereafter. 500 g. of a mixture of 1 part by weight of transdichloro-1,2-ethylene and 1 part by weight of propane free from propylene were added and remained in contact for 1 hour. Thereafter the mass was cooled to room temperature, vented, and the product, pearls, was washed and dried at 50° C. for 24 hours by a current of air. The yield was 3.3 kg. of pearls having a mean diameter of 0.62 mm., a yield of 95% by weight of the butene-1 and propene employed. The pearls contain 49% of propylene and 51% of ethyl-ethylene based on the total weight of ethyl-ethylene and propylene in the product. The molar ratio of $SO_2$ to ethyl-ethylene and propylene groups in the product was 1. These pearls contain 6.1% by weight of the expansion agent. When expanded by a mixture of water vapor and hot air at 160°–170° C., the pearls had an expanded apparent mass volume of 45 kg./m.$^3$.

An advantage of the process is that it proceeds by simple and readily controlled steps to produce cellular products having preselected densities within the range indicated hereinabove. Another advantage is in the superiority of these pearls over the pearls made from $SO_2$ and a single one of the olefins, an advantage which could not have been expected. Another advantage is the superiority of these pearls in molding techniques and the ease and certainty with which they can be expanded to product those selected densities which are perfectly adapted to particular uses. Another advantage is in that the size of the expansible pearls can be varied and their transparency changed, for example, the product of Example 1 being translucent and averaging 0.5 mm.; whereas, the pearls of Example 3 had a mean diameter of 0.8 mm. and were opaque.

As many apparently widely different embodiments of the present invention may be made without departing from the spirit and scope thereof, it is to be understood that the invention is not limited to the specific embodiments.

What is claimed is:

1. Thermally expansible pearls of terpolymers of $SO_2$, butene-1 and propene, containing an expansion agent, in which the ethyl-ethylene groups, from the butene-1, represent from 90% to 40% of the total weight of the ethyl-ethylene and propylene groups, the balance to make 100% being propylene groups, the molar ratio of $SO_2$ to the total of ethyl-ethylene and propylene groups equalling 1, the pearls having a mean diameter of 0.4 to 2 mm.

2. Expanded terpolymers from pearls according to claim 1 in which the density is between 10 and 50 kg./m.$^3$.

3. A method of making pearls of thermally expansible terpolymers of $SO_2$, butene-1, and propene which comprises suspending in aqueous medium containing a suspension agent and a polymerization catalyst with agitation at a temperature between about 20° and 65° C. at constant volume, an excess of $SO_2$ and butene-1, adding the propene progressively, as the polymerization proceeds, and mixing a thermal expansion agent with the terpolymer, in the suspension, in proportion of about 5%–12% by weight of the terpolymer.

4. The method of claim 3 in which the aqueous medium initially receives $SO_2$ and butene-1, and the propene is added progressively as their copolymerization proceeds.

5. The method of claim 3 in which the addition of propene is delayed until substantial polymerization of $SO_2$ and butene-1 has occurred, and the temperature of reaction is raised as the propene is added to form the terpolymer.

6. The method of claim 3 in which the butene-1 and propene are added simultaneously.

7. The method of claim 3 in which the $SO_2$ is present in an excess of that capable of acceptance into the terpolymer, which preferably is from 50 to 200% by weight.

8. The method of claim 3 in which the suspension agent is one of the group consisting of the polyvinyl alcohols and cellulose derivatives.

9. The method of claim 3 in which the catalysts are organic peroxides yielding free radicals in quantity yielding about 5 to 30 mg. of active oxygen per mole of polymerizable olefins.

10. The method of claim 3 in which the expansion agent is mixed with the terpolymer and absorbed thereby.

References Cited
UNITED STATES PATENTS 2,481,596  9/1949  Irany et al. _____ 260—79.3 R

FOREIGN PATENTS 1,453,275  5/1967  France _____ 260—2.5 B

SAMUEL H. BLECH, Primary Examiner

W. J. BRIGGS, SR., Assistant Examiner

U.S. Cl. X.R.

260—2.5 HA, 79.3 A, 80.78